July 24, 1962

M. A. LEAVITT ETAL  
TELESCRIBER APPARATUS 3,046,336

Filed Sept. 26, 1960

INVENTORS.  
MINARD A. LEAVITT  
EDWIN A. PECKER  
DAVID H. BURNS  
BY  
Christie, Parker & Hale  
ATTORNEYS.

July 24, 1962   M. A. LEAVITT ETAL   3,046,336
TELESCRIBER APPARATUS
Filed Sept. 26, 1960   4 Sheets-Sheet 3

INVENTORS.
MINARD A. LEAVITT
EDWIN A. PECKER
DAVID H. BURNS
BY
Christie, Parker & Hale
ATTORNEYS.

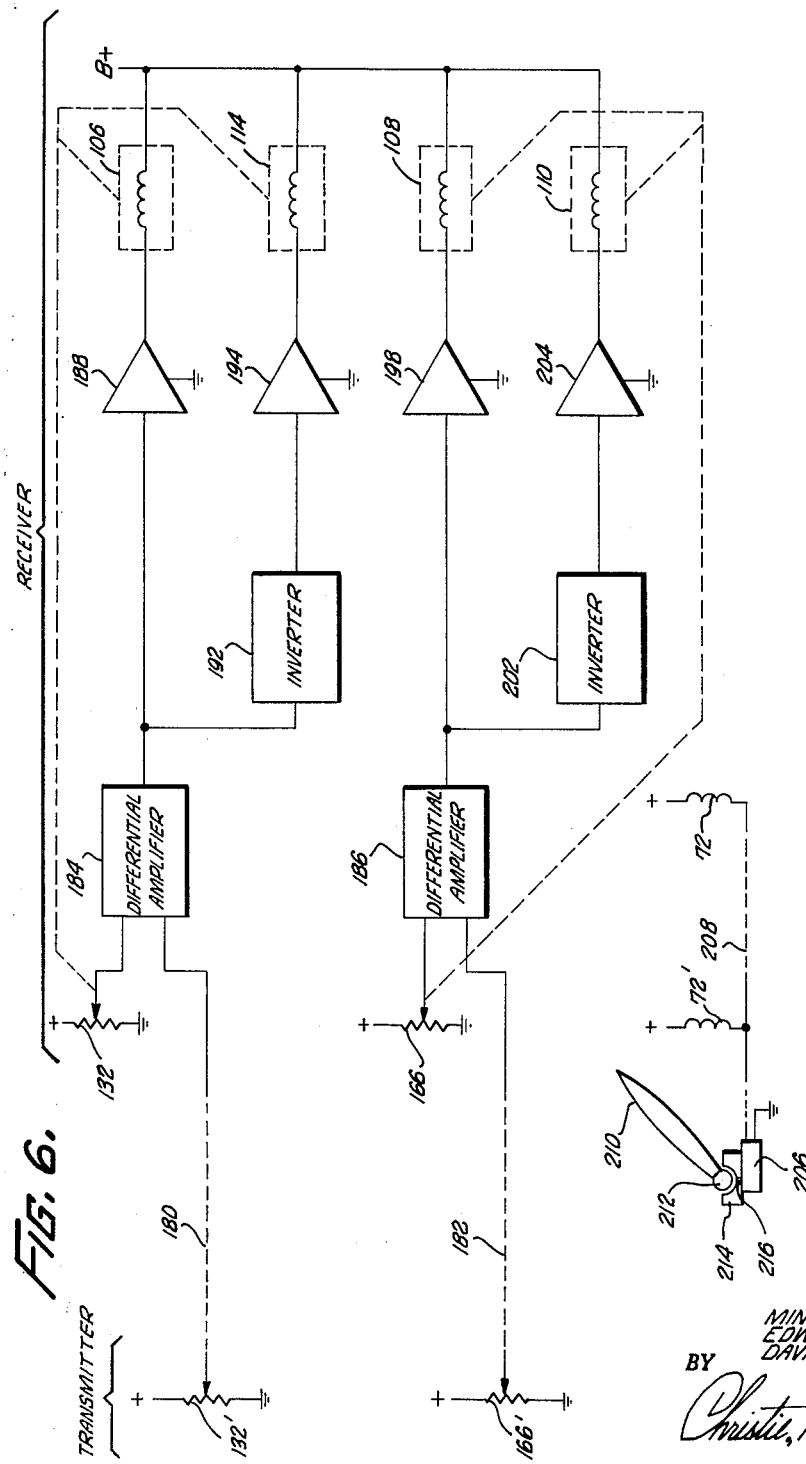

United States Patent Office 3,046,336
Patented July 24, 1962

3,046,336
TELESCRIBER APPARATUS
Minard A. Leavitt, Playa Del Rey, and Edwin A. Pecker and David H. Burns, Los Angeles, Calif., assignors to Telautograph Corporation, Los Angeles, Calif., a corporation of Virginia
Filed Sept. 26, 1960, Ser. No. 58,455
7 Claims. (Cl. 178—18)

This invention relates to telescribing equipment, and more particularly, is concerned with improved apparatus for translating handwritten messages into electrical signals and reproducing the handwriting at a remote point in response to the electrical signals.

Telescribing equipment for translating handwritten messages electrically over transmission wires is well known. Such equipment involves, at a transmitting station, a stylus manipulated by an operator as he would a writing instrument such as a pen. Through electromechanical means or electronic means, the motions are resolved into electrical signals which are transmitted to the receiver. Again by electromechanical means or by electronic means the signals are used to produce a visual reproduction of the handwriting.

All electronic systems, while perhaps being more accurate in reproducing the information through the absence of any mechanical inertia, have proved to be too expensive and complicated for most applications. Furthermore, they do not provide a permanent record of the message.

In the electromechanical system, where mechanical linkages connect the stylus to suitable transducers, a number of problems are encountered. The linkage must be light enough so as not to interfere with the normal hand movements. At the same time, the linkage must be rugged enough to withstand physical abuse and yet reproduce the motions of the stylus accurately. It is desirable that the linkage operate over a large writing area. At the same time, the size of the machine should not be too large with relation to the area of the writing surface.

Another design consideration is the need for making carbon copies. This means that the writing stylus must be capable of applying substantial pressure to the writing surface. As a result, the driving linkage must be sufficiently rugged to accurately position the stylus against the drag imposed by the multiple copy pressure requirement.

The present invention provides an improved telescriber unit which may be employed both as a transmitter for generating electrical signals indicative of position of a stylus or as a receiver for converting the signals into a visible tracing on paper.

The invention provides a rugged mechanism for positioning a stylus over a large writing area. The drive is powerful enough to move the stylus easily even when making a plurality of carbon copies, yet responsive enough to move the stylus through the intricate and rapid movements required to faithfully reproduce handwriting. Furthermore, the drive arrangement of the present invention is quite compact, so that the entire telescribing unit need be very little larger than the effective writing area.

In brief, the novel design of the present invention comprises a main frame including a pair of spaced guide members on which a bridge is moveably supported. A carriage is in turn moveably supported on the bridge. A pen secured to the carriage is thus moveable over a predetermined area defining a writing surface by imparting movement to the bridge and carriage. The carriage is moveable on two mutually perpendicular axes in the plane of the writing surface by a uniquie cable arrangement which drives the bridge and carriage from a common drive mechanism including four electromagnetic clutches mounted on a common drive shaft. The cables are driven through selective control of the several clutches to move the pen over the writing surface. Potentiometers are driven by the cable system for generating position information signals. The signals generated by the local potentiometers are compared with the signals received from a transmitter unit or other signal source and the difference between the two signals is used to control the respective clutches for correctly positioning the stylus.

For a more complete understanding of the invention, reference should be made to the accompanying drawings wherein:

FIG. 6 is a schematic diagram of the electrical circuit for controlling the telescriber system.

Figure 1:
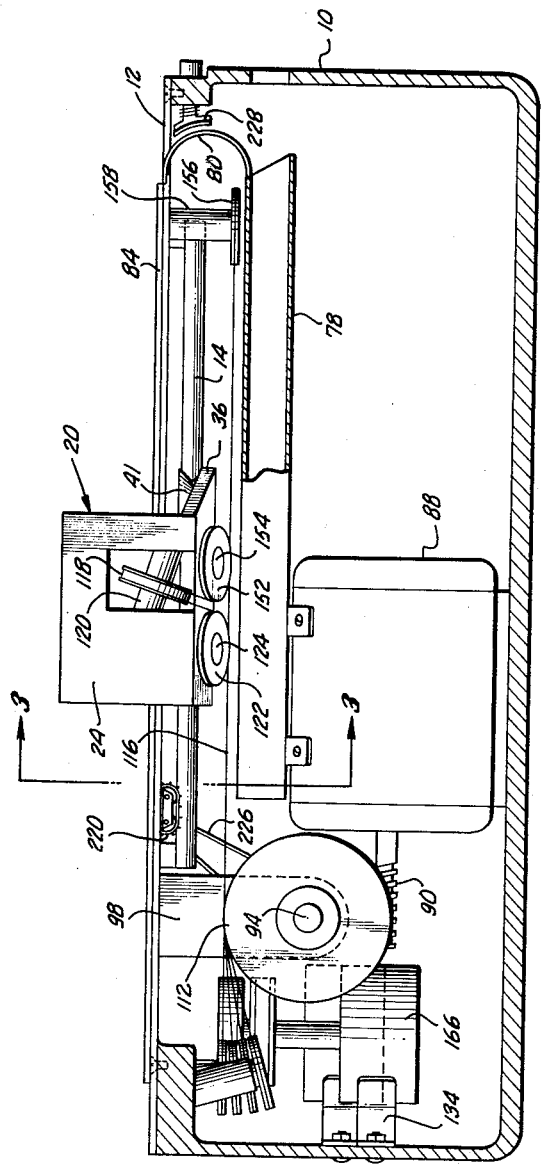
FIG. 1 is a side elevational view with the cover and outer box frame cut away.
Figure 3:
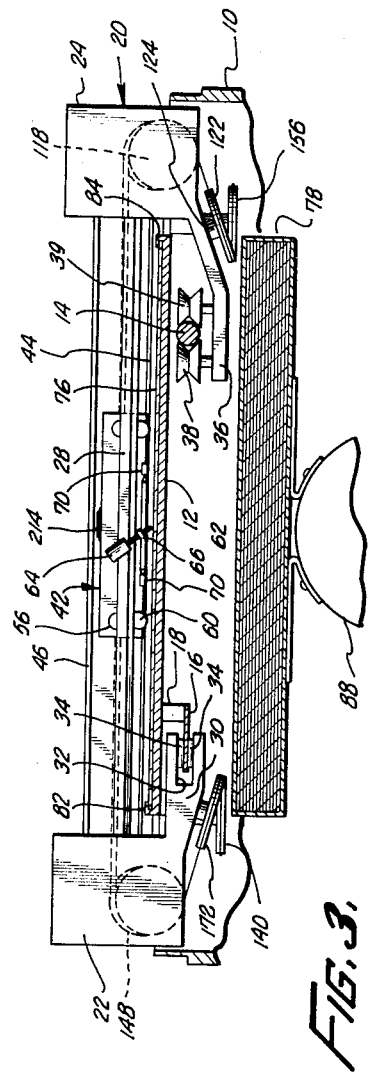
FIG. 3 is a fragmentary sectional view taken on the line 3—3 of FIG. 1.

Referring to FIGS. 1–5 of the drawings in detail, the numeral 10 indicates generally the outer frame of the machine, which preferably is in the form of a single cast box structure open at the top. Mounted on the outer frame 10 is a chassis support plate 12. This plate, over a substantial portion of its length, is narrower than the box frame 10, leaving elongated open regions on either side of the plate 12. Secured underneath and extending parallel to one edge of the plate 12 is a guide rod 14 of circular cross section. A flat guide plate 16 extends parallel with the opposite edge of the plate 12 and is supported in parallel relationship thereto by lugs such as indicated at 18 in FIG. 3.

A bridge assembly, indicated generally at 20, includes a pair of end members 22 and 24 joined above the surface of the plate 12 by a pair of guide members 26 and 28. The end member 22 includes a bracket portion 30 which extends below the bottom surface of the plate 12 and is slotted as indicated at 32, the slot receiving the flat guide plate 16. Suitable flat bushings 34 engage the surfaces of the flat guide plate 16 to give sliding vertical support to the end member 22.

The end member 24 is similarly provided with a bracket portion 36 from which are rotatably supported two sets of opposed grooved guide wheels 38, 39 and 40, 41. The grooved guide wheels engage the guide rod 14 at spaced points, providing both lateral and vertical guidance and support to the end member 24.

Moveably supported on the guide members 26 and 28 of the bridge assembly 20 is a carriage assembly indicated generally at 42. As thus shown in FIG. 5, the bridge spanning guide member 26 is channel shaped, providing a lower flange 44 and an upper flange 46. Carriage assembly 42 includes a pair of spaced guide rollers 48 and 50 which ride on the inside of the lower flanged portion 44. A coil spring 51 carried in a hole in the carriage assembly 42 presses against the upper flange 46.

The guide member 28 is provided with an upper groove 52 and a lower groove 54. The upper groove 52 is engaged by a pair of rollers 56 and 58 which are rotatably supported by the carriage assembly 42. A similar pair of rollers, one of which is indicated at 60, engage the groove 54 and are rotatably supported from the carriage assembly 42. In this way the carriage assembly 42 is guided for lateral movement along the guide members of the bridge assembly 20. Thus it will be seen that the combination of the bridge and carriage permits movement of the carriage assembly 42 in two dimensions over a predetermined area.

Supported from the carriage assembly 42 is a pen 62 having an ink reservoir 64. The pen and ink reservoir are supported on the end of an arm 66 which is supported by pivots 68 from a pair of lugs 70 projecting from the carriage assembly 42. An armature plate 67 which is integral with the arm 66 extends below the carriage assembly 42. A pair of solenoids 72 and 74 mounted in the carriage assembly 42 have their pole faces positioned above the armature plate 67. In this manner, when the solenoids are energized, the armature plate 67 is drawn towards the solenoids and the pen 62 is pressed downwardly towards the plate 12. When the solenoids are not energized, the armature plate 67 is sufficiently heavy to lift the pen 62 away from the plate 12 about the pivot 68.

The pen 62 thus may be made to engage a writing surface such as provided by a strip of paper 76 which passes over the top surface of the plate 12. The paper strip 76, which may be folded and stored as a pack beneath the plate 12 in a hollow paper receptacle 78, passes around a semi-circular guide 80 and along grooves provided by guide strips 82 and 84 positioned along the edges of the upper surface of the plate 12.

To produce a visual trace on the paper by remote control, movement is imparted to the carriage assembly 42 and the bridge 20 from an electric motor 88 through a special clutch arrangement and cable connection. The drive motor 88 is mounted on the bottom of the main frame box 10. A worm gear 90 driven by the motor 88 engages a worm wheel 92 mounted on a horizontal shaft 94. Shaft 94 is journalled in bearings carried in bearing support brackets 96 and 98 projecting downwardly from the plate 12.

Mounted at either end of the shaft 94 are two pairs of magnetic clutches indicated generally at 100 and 102. The pair of clutches 100 include a common drive member 104 which is continuously rotated by the shaft 94, and a pair of driven members 106 and 108. The pair of clutches 102 similarly include a common drive member 110 and a pair of driven members 112 and 114. Driven members 106, 108, 112 and 114 each comprise an outer cylindrical drum surface. Electromagnetic means, not shown, is located within the region defined by the outer drum surface of each of the driven members and arranged such that electrically energizing any one of four electromagnets respectively couples the driven members 106, 108, 112 and 114 to the drive shaft 94 through the drive members 104 and 110 respectively. Electromagnetic clutches of the general type used in this present invention are well known in the art and, therefore, it is not believed necessary to describe such clutches in more detail. See, for example, the clutch described in Patent No. 2,706,544. The clutches have frictional surfaces which are pressed together by electromagnets, the pressure being controlled by the amount of current passed through the electromagnets.

By means of a special cable arrangement, the four electromagnetic clutches can be used to control movement of the carriage from the drive motor 88. The cable arrangement includes two lengths of cable, both lengths being anchored at the two ends thereof to the carriage assembly 42. The first length of cable, indicated at 116, extends from the end anchored to the lefthand side of the carriage assembly 42 as viewed in FIG. 4 over a pulley 118 carried by a shaft 120 in the end member 24 of the bridge assembly 20. After passing down around the pulley 118, the first cable section 116 passes around a pulley 122 journalled on a stud shaft 124 supported by and projecting down from the bracket portion 36 of the bridge assembly. The first cable section 116 then makes several turns around the drum surface of the driven member 114. The cable may be positively secured to the driven member 114 at one point since a portion of the cable never leaves the drum surface through the maximum extent of movement.

The cable 116 then makes a quarter turn around a guide pulley 126 which is rotatably supported from the main outer frame 10 by stud shaft 128. The cable section 116 after making a quarter turn around the pulley 126 makes several turns around a drum 130 which is secured to the shaft of a potentiometer 132. Potentiometer 132 is supported from the plate 12 by a suitable bracket 134.

After passing around the drum 130, the cable section 116 takes a quarter turn around a guide pulley 136 rotatably supported by a stud shaft 138 from the outer frame 10, and then passes in several turns around the drum surface of the driven member 106. Coming off the driven member 106, the cable section 116 extends the full length of the plate 12 to a pulley 140 rotatably supported on the end of a stud shaft 142 extending down from the plate 12. After making a half turn around the pulley 140, the first cable section 116 makes a quarter turn around a pulley 144 rotatably supported on a stud shaft 146 which is secured to the underside of the portion 30 of the carriage end frame member 22.

After making a quarter turn around the pulley 144, the cable 116 passes around a pulley 148 journalled on a shaft 150 in the end member 22 and thence passes parallel to the guide member 26 back to the carriage assembly 42 where it is anchored.

Figure 2:
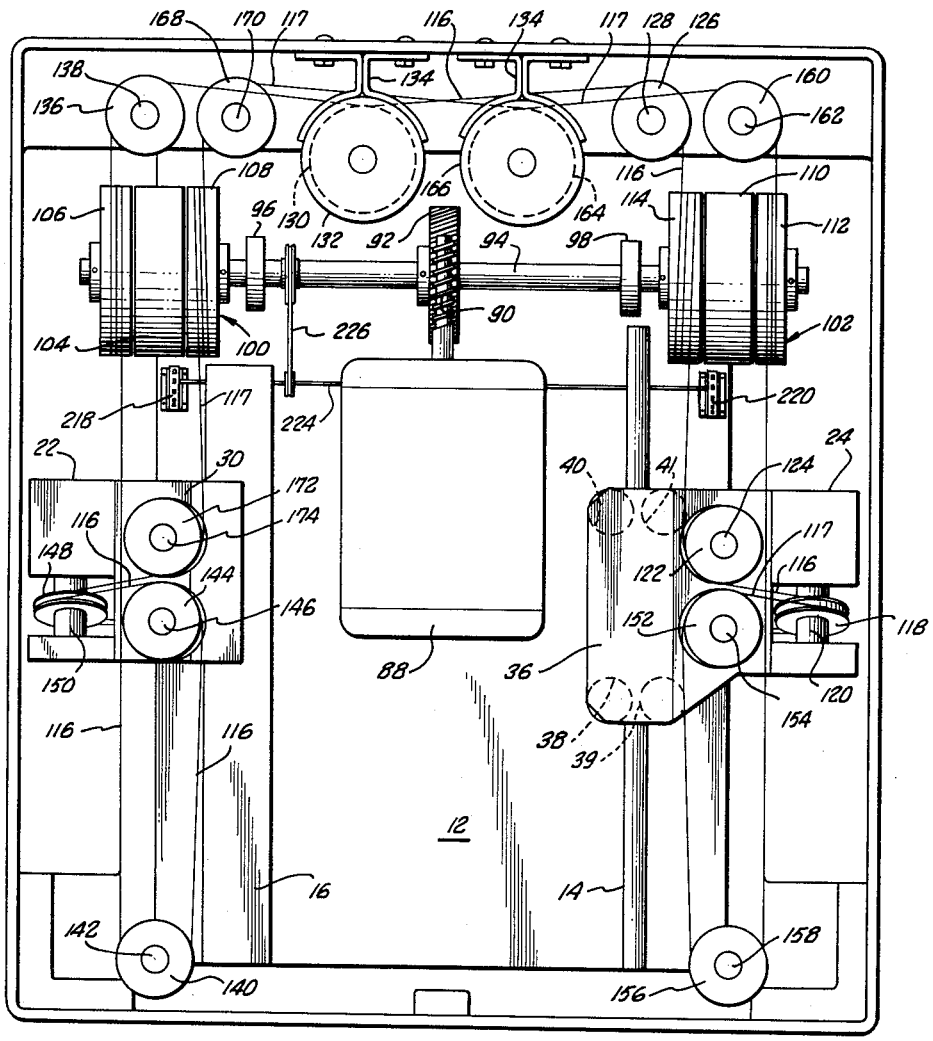
FIG. 2 is a bottom view with the outer box frame cut away.

In a similar fashion a second cable section 117 extends from one end anchored to the carriage assembly 42 around the pulley 118 and makes a quarter turn around a pulley 152 rotatably supported by stud shaft 154 secured to the lower surface of the portion 36 of the bridge end frame member 24, as best seen in FIG. 2. After making a half turn around a pulley 156 rotatably supported on a stud shaft 158 extending from the bottom of plate 12, the cable 117 takes several turns around the drum surface of the driven member 112. After leaving the drum surface of the driven member 112, the cable 117 makes a quarter turn around a pulley 160 rotatably supported on a stud shaft 162. The cable 117 then makes one or more turns around the drum 164 secured to the shaft of a potentiometer 166 supported by the bracket 134 in the same manner as the potentiometer 132.

After making a quarter turn around a pulley 168 rotatably supported on a stud shaft 170 from the frame 10, the cable 117 makes several turns around the drum surface of the driven member 108 and then makes a quarter turn around a pulley 172 rotatably supported on a stud shaft 174 secured to the under surface of the portion 30 of the bridge end member 22. After making a quarter turn around the pulley 172, the cable 117 passes around the pulley 148 and thence back to the carriage assembly 42 to which it is anchored.

With this cable arrangement, energizing of any one of the four clutches produces equal movement of the bridge and carriage. The result is movement of the pen along one or the other of the two mutually perpendicular 45° diagonal axes. The direction of movement along either of these axes is determined by which of the two clutches associated with a particular one of the two cable sections is energized.

If two clutches are simultaneously fully energized, the two clutches being associated respectively with each of the two cable sections 116 and 117, movement of the pen along a zero or X axis or along a 90° or Y axis is produced. Again the direction of movement is determined by the combination of two clutches selectively energized. By varying the relative speed at which the two cables are driven (by varying the clutch energizing currents), movement in any direction over the writing surface can be obtained. Control of the four clutches to obtain the desired speed and direction of drive of the two cable sections 116 and 117 in response to control signals is provided by the control circuit shown schematically in FIG. 6.

The apparatus as described above can be employed either in the transmitter or receiver of a telescribing system. Movement of the carriage assembly 42 at the transmitting unit as produced in writing a message, is converted into a pair of electrical output signals by means of the potentiometers 132 and 166. At the receiver unit, the instantaneous potentials of the two received signals are compared with the potentials derived from the corresponding potentiometers at the receiver unit. The electromagnetic clutches are controlled to move the bridge assembly 20 and carriage assembly 42 at the receiver station in a manner to maintain the difference between the received signals and the signals across the potentiometers at the receiving unit at zero. The pen at the receiver thus follows the movement of the pen at the transmitter to reproduce the message.

As shown in FIG. 6, potentiometers 132' and 166' are connected across a D.C. potential source. The wiper contacts are connected to a pair of transmission lines 180 and 182 to the receiver. The transmission lines are respectively connected at the receiver to one input of a pair of differential amplifiers 184 and 186. At the receiver station, the potentiometers 132 and 166 are similarly connected across a D.C. potential source with the respective sliding contacts being connected to the other input of each of the respective differential amplifiers 184 and 186. The output from the differential amplifier 184 is coupled to a power amplifier 188 which controls the current through the electromagnetic coil of the clutch associated with the driven member 106.

The output of the differential amplifier 184 is also coupled through an inverter 192 to the input of a power amplifier 194 which supplies current to the electromagnetic coil of the clutch associated with the driven member 114. Similarly the output from the differential amplifier 186 is connected to the input of a power amplifier 198 which controls a current through the electromagnetic coil of the magnetic clutch associated with the driven member 108. Also the output of the differential amplifier 186 is coupled through an inverter 202 to the input of a power amplifier 204 which in turn controls the current through the electromagnetic coil 206 of the clutch associated with the driven member 110.

Figure 4:
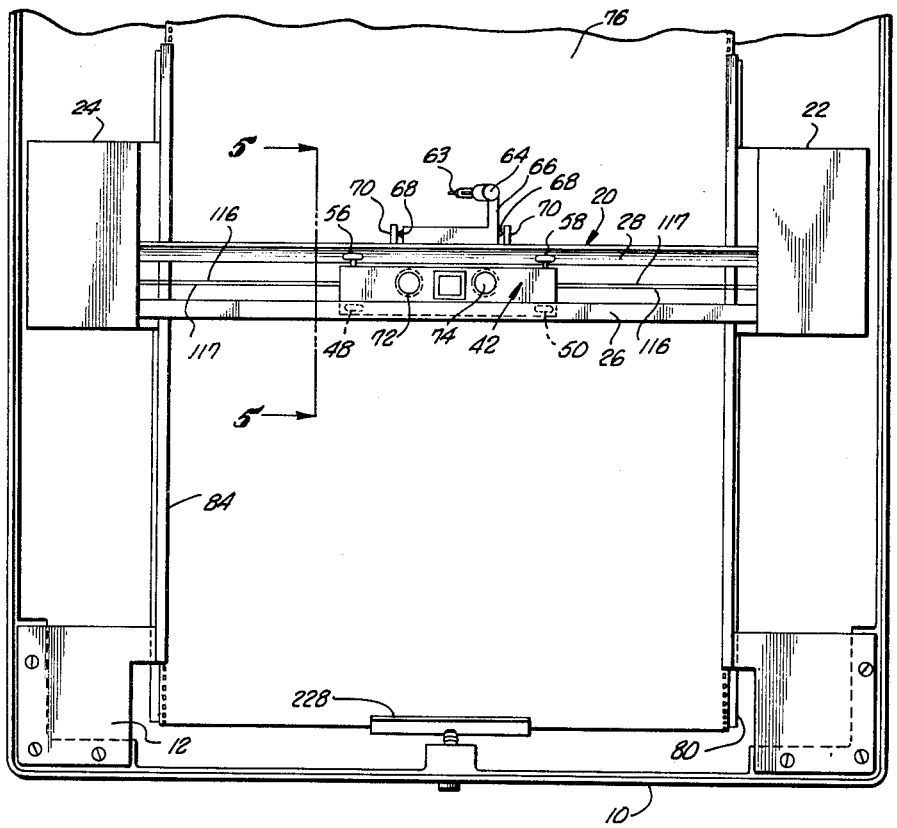
FIG. 4 is a partial top view.
Figure 5:
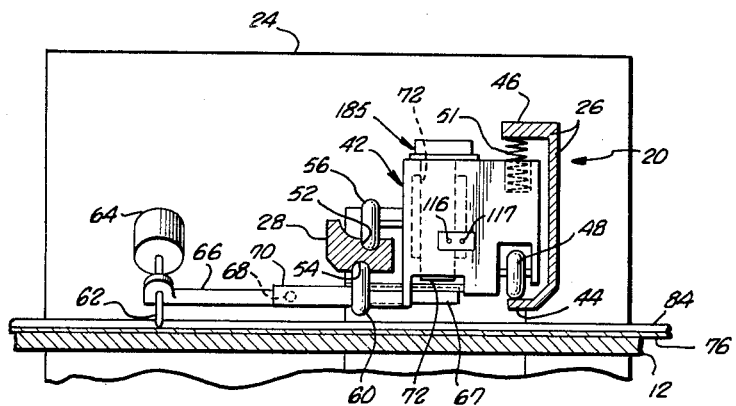
FIG. 5 is a fragmentary sectional view taken on the line 5—5 of FIG. 4.

In addition to the positioning signals, it is desirable to have a signal for raising and lowering the pen at the receiver through operation of the solenoid 72. This may be accomplished, for example, by a switch 206 at the transmitter which connects the solenoid coil 72 at the receiver to ground through a third line 208 interconnecting the transmitter and receiver stations. Solenoid coil 72 is connected to a positive potential source so that when the switch 206 is closed, the solenoid is energized causing the pen to engage the surface of the paper. The switch 206 may be operated by a writing stylus 210 used at the transmitting end by the operator in moving the carriage and associated pen over the surface of the paper at the transmitting station. The stylus 210 has a ball tip 212 which engages a socket formed by a socket member 214. The socket member 214 is mounted on the carriage assembly 42 as shown in FIGURE 4. By engaging the stylus 210 with its ball end in the socket member, the operator, by manipulating the stylus, moves the carriage and associated pen over the surface of the paper at the transmitting end to produce a written message. These movements are translated in the manner described into movements of the carriage and associated pen at the receiver station. The switch 206 is arranged with an actuating pin 216 projecting up into the socket in such a way that downward pressure of the stylus in the socket actuates the switch 206. In this manner up and down movements of the stylus result in up and down movements of the writing pen at the receiving station. The lift solenoid at the transmitting station, indicated generally at 72' is arranged to be operated by the same switch 206 so that simultaneous lowering and raising of the pen at both the transmitting station and the receiving station can be effected.

After completion of a written message, the paper is advanced out of the machine and a clean portion of the strip of paper brought into position under the writing area. One suitable paper drive arrangement is shown in FIGURE 2 in which a pair of paper drive wheels 218 and 220, having a plurality of projecting lugs, are arranged to engage holes along the edge of the paper. The paper drive wheels 218 and 220 are mounted on the end of a common drive shaft 224 which is driven from the shaft 94 by a belt 226. As shown in FIGURES 1 and 4, a spring-loaded brake 228 presses against the paper where it passes up from the paper storage chamber 78 under the top of the plate 12. The brake 228 prevents the paper from being pulled forward by the drive wheels 218 and 220, causing the belt 226 to slip. When the brake is released, the drive wheels 218 and 220 pull the paper forward until the brake is again applied. By this arrangement, the paper is maintained in a state of tension over the writing surface provided by the plate 12.

The invention as set forth above provides an extremely sensitive, fast-acting servo system which is capable of reproducing normal handwriting motions. Because of its high sensitivity and accuracy, the apparatus is useful as an X—Y plotter as well as a telescriber. The arrangement of cable and clutch drive results in a compact and yet powerful plotter device. For a given paper size, a relatively small machine is achieved.

What is claimed is:

1. A telescriber comprising a main frame including a pair of spaced parallel guide members, a bridge member movably supported on said guide members, a carriage member, means for supporting the carriage member for movement along the bridge member in a direction perpendicular to the direction of movement of the bridge member, whereby the carriage member can be positioned anywhere within a predetermined area, four cable drums mounted on a common drive shaft, means for driving the shaft, four electromagnetic clutches for selectively driving the drums from the common shaft in response to electrical control signals appplied thereto, whereby any one of the four drums can be rotated with the drive shaft, a first length of cable having both ends secured to the carriage member, the first cable extending from one end in one direction parallel to the direction of movement of the carriage member along the bridge, guide means mounted on the bridge member for directing the first cable through 90 degrees and parallel to the guide members to a first one of the drums, the cable passing around the drum and movable with rotation of the drum, guide means mounted on the main frame for directing the first cable through a total angle of 180 degrees from the first drum to a second one of the drums, guide means mounted on the main frame for directing the first cable from the second drum parallel to the guide members along the full length of the guide members through 180 degrees, and back to the bridge member, guide means mounted on the bridge member for directing the first cable through 90 degrees back to the other end secured to the carriage member, a second length of cable having both ends secured to the carriage member, the second cable extending from one end parallel to the direction of movement of the carriage member along the bridge, guide means mounted on the bridge member for directing the second cable through 90 degrees and parallel to the guide members to a third one of the drums, guide means mounted on the main frame for directing the second cable through a total angle of 180 degrees from the third drum to a fourth one of the drums, guide means mounted on the main frame for directing the second cable from the fourth drum parallel to the guide members along the full length of the guide members, through 180 degrees, and back to the bridge member, guide means mounted on the bridge member for directing the second cable through 90 degrees back to the other end secured to the carriage member, first and second position signal generating means mounted on the main frame and responsive respectively to movement of the first and second cables for generating output signals indicative of the instantaneous position in two coordinates of the carriage member, means for continuously comparing the output signals with externally developed input signals conveying instantaneous positional information to develop the control signals for selectively energizing the electromagnetic clutches, means supported by the main frame and providing a writing surface beneath the carriage member, and a writing element suported from the carriage for producing a visual trace on the writing surface.

2. A telescriber comprising a main frame including a pair of spaced parallel guide members, a bridge member movably supported on said guide members, a carriage member, means for supporting the carriage member for movement along the bridge member in a direction perpendicular to the direction of movement of the bridge member, whereby the carriage member can be positioned anywhere within a predetermined area between the guide members, four cable drums mounted on a common drive shaft, means for driving the shaft, four clutches for selectively driving the drums from the common shaft, whereby any one of the four drums can be rotated with the drive shaft, a first length of cable having both ends secured to the carriage member, the first cable extending from one end in one direction parallel to the direction of movement of the carriage member along the bridge, guide means mounted on the bridge member for directing the first cable through 90 degrees and parallel to the guide members to a first one of the drums, the cable being movable with rotation of the drum, guide means mounted on the main frame for directing the first cable through a total angle of 180 degrees from the first drum onto a second one of the drums, guide means mounted on the main frame for directing the first cable from the second drum parallel to the guide members along the full length of the guide members, through 180 degrees, and back to the bridge member, guide means mounted on the bridge member, guide means mounted on the bridge member for directing the first cable through 90 degrees back to the other end secured to the carriage member, a second length of cable having both ends secured to the carriage member, the second cable extending from one end parallel to the direction of movement of the carriage member along the bridge, guide means mounted on the bridge member for directing the second cable through 90 degrees and parallel to the guide members to a third one of the drums, guide means mounted on the main frame for directing the second cable through a total angle of 180 degrees from the third drum onto a fourth one of the drums, guide means mounted on the main frame for directing the second cable from the fourth drum parallel to the guide members along the full length of the guide members, through 180 degrees, and back to the bridge member, guide means mounted on the bridge member for directing the second cable through 90 degrees back to the other end secured to the carriage member, control circuit means for actuating selected ones of the clutches so as to move the carriage and bridge through the cables, first and second position signal generating means mounted on the main frame and responsive respectively to movement of the first and second cables for generating output signals indicative of the instantaneous position of the carriage member, means supported by the main frame and providing a writing surface between the guide members and beneath the carriage member, a writing element supported from the carriage for producing a visual trace on the writing surface, and means for interrupting the operation of the writing element in producing a visual trace.

3. Apparatus comprising a main frame including a pair of spaced parallel guide members, a bridge member movably supported on said guide members, a carriage member, means for supporting the carriage member for movement along the bridge member in a direction perpendicular to the direction of movement of the bridge member, whereby the carriage member can be positioned anywhere within a predetermined area between the guide members, four cable drums mounted on a common drive shaft, for four clutches selectively driving the drums from the common shaft, whereby any one of the four drums can be rotated with the drive shaft, a first length of cable having both ends secured to the carriage member, the first cable extending from one end in one direction parallel to the direction of movement of the carriage member along the bridge, guide means mounted on the bridge member for directing the first cable through 90 degrees and parallel to the guide members to a first one of the drums, the cable being movable with rotation of the drum, guide means mounted on the main frame for directing the first cable through a total angle of 180 degrees from the first drum to a second one of the drums, guide means mounted on the main frame for directing the first cable from the second drum parallel to the guide members along the full length of the guide members, through 180 degrees, and back to the bridge member, guide means mounted on the bridge member for directing the first cable through 90 degrees back to the other end secured to the carriage member, a second length of cable having both ends secured to the carriage member, the second cable extending from one end parallel to the direction of movement of the carriage member along the bridge, guide means mounted on the bridge member for directing the second cable through 90 degrees and parallel to the guide members to a third one of the drums, guide means mounted on the main frame for directing the second cable through a total angle of 180 degrees from the third drum to a fourth one of drums, guide means mounted on the main frame for directing the second cable from the fourth drum parallel to the guide members along the full length of the guide members, through 180 degrees, and back to the bridge member, guide means mounted on the bridge member for directing the second cable through 90 degrees back to the other end secured to the carriage member, and means for actuating selected clutches to drive the first cable and/or the second cable and impart movement to the bridge member and carriage member for positioning the carriage member within a predetermined area.

4. A telescriber comprising a main frame including a pair of spaced parallel guide members, a bridge member movably supported on said guide members, a carriage member, means for supporting the carriage member for movement along the bridge member in a direction perpendicular to the direction of movement of the bridge member, whereby the carriage member can be positioned anywhere within a predetermined area between the guide members, four cable drums mounted on a common drive shaft, means for driving the shaft, four electromagnetic clutches for selectively driving the drums from the common shaft in response to electrical control signals applied thereto, whereby any one of the four drums can be rotated with the drive shaft, cable means engaging the respective drums for moving the carriage member and bridge member in either direction along their respective paths of movement in response to engagement of selected ones of the clutches, first and second position signal generating means mounted on the main frame and responsive respectively to movement of the cable means for generating output signals indicative of the instantaneous position of the carriage member, means supported by the main frame and providing a writing surface beneath the carriage member, a writing element supported from the carriage member for producing a visual trace on the writing surface, and means for interrupting the operation of the writing element in producing a visual trace.

5. A telescriber comprising a main frame including a pair of spaced parallel guide members, a bridge member movably supported on said guide members, a carriage member, means for supporting the carriage member for movement along the bridge member in a direction perpendicular to the direction of movement of the bridge member, whereby the carriage member can be positioned anywhere within a predetermined area between the guide members, four cable drums mounted on a common drive shaft, means for driving the shaft, four clutches for selectively driving the drums from the common shaft, whereby any one of the four drums can be rotated with the drive shaft, cable means engaging the respective drums for moving the carriage member and bridge member in either direction along their respective paths of movement in response to engagement of selected clutches, control circuit means for actuating selected ones of the clutches so as to move the carriage and bridge through the cables, first and second position signal generating means mounted on the main frame and responsive respectively to movement of the cable means for generating output signals indicative of the instantaneous position of the carriage member, means supported by the main frame and providing a writing surface between the guide members and beneath the carriage member, and a writing element supported from the carriage for producing a visual trace on the writing surface.

6. Apparatus comprising a main frame including a pair of spaced parallel guide members, a bridge member movably supported on said guide members, a carriage member, means for supporting the carriage member for movement along the bridge member in a direction perpendicular to the direction of movement of the bridge member, whereby the carriage member can be positioned anywhere within a predetermined area between the guide members, four cable drums mounted on a common drive shaft, means for driving the shaft, four clutches for selectively driving the drums from the common shaft, wherby any one of the four drums can be rotated with the drive shaft, cable means engaging the respective drums for moving the carriage member and bridge member in either direction along their respective paths of movement in response to engagement of selected clutches, and means for actuating selected clutches to drive the cable means to impart selective movement to the bridge member and carriage member for positioning the carriage member within a predetermined area.

7. Line tracing apparatus comprising a frame, a pair of parallel guide members mounted on the frame, a bridge member movably supported on the guide members, a writing member movably supported on the bridge member for movement perpendicular to the movement of the bridge member, means defining a writing surface supported by the frame and extending beneath the area of movement of the writing member, and means for driving the writing member and bridge member including a drive shaft rotatably supported by the frame member beyond the writing area and extending parallel to the direction of movement of the writing member along the bridge member, four drums journalled on the shaft, four electromagnetic friction clutches for selectively driving the drums from the shaft in response to electrical control signals applied thereto, means for rotating the shaft, two pairs of idler pulleys rotatably mounted at opposite ends of the bridge member, direction reversing idler pulleys rotatably mounted on the frame adjacent the ends of the guide members remote from the drive shaft, a drive cable interconnecting the drums and the writing member having four portions secured to and extending from the writing element parallel to the line of travel of the writing element along the bridge member to each of said idler pulleys at opposite ends of the bridge member, two portions extending from two of said idler pulleys on opposite ends of the bridge member parallel to said guide members and respectively passing around a first one and a second one of said drums, two portions extending in the opposite direction parallel to the guide members respectively from the other two of said idler pulleys on opposite ends of the bridge member around the respective direction reversing idler pulleys, extending back parallel to the guide members and respectively passing around a third one and a fourth one of said drums, and portions extending from the first drum to the fourth drum and from the second to the third drum.

References Cited in the file of this patent

UNITED STATES PATENTS

| | | |
|---|---|---|
| 461,473 | Gray | Oct. 20, 1891 |
| 1,493,586 | Wood | May 13, 1924 |
| 2,322,653 | Mitchel | June 22, 1943 |
| 2,415,718 | Wilson | Feb. 11, 1947 |
| 2,626,979 | Woods | Jan. 27, 1953 |
| 2,706,544 | Schuman | Apr. 19, 1955 |